(12) United States Patent
Mori

(10) Patent No.: US 7,480,228 B2
(45) Date of Patent: Jan. 20, 2009

(54) OPTICAL DISC APPARATUS

(75) Inventor: Taiki Mori, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 724 days.

(21) Appl. No.: 11/187,014

(22) Filed: Jul. 22, 2005

(65) Prior Publication Data

US 2006/0018235 A1    Jan. 26, 2006

(30) Foreign Application Priority Data

Jul. 22, 2004    (JP) ............................. 2004-213801

(51) Int. Cl.
*G11B 7/00*    (2006.01)
(52) U.S. Cl. ...................... 369/112.07; 369/112.04; 369/44.37; 369/44.23
(58) Field of Classification Search .................. None
See application file for complete search history.

(56) References Cited

U.S. PATENT DOCUMENTS

| | | | | |
|---|---|---|---|---|
| 6,366,548 B1 * | 4/2002 | Ohyama | ................. | 369/112.04 |
| 6,822,771 B2 * | 11/2004 | Funato et al. | ................. | 359/15 |
| 7,130,259 B2 * | 10/2006 | Takasuka et al. | ....... | 369/112.07 |
| 7,215,609 B2 * | 5/2007 | Shimano et al. | .......... | 369/44.37 |
| 2002/0196726 A1 * | 12/2002 | Takeda | ................... | 369/112.04 |

FOREIGN PATENT DOCUMENTS

| | | |
|---|---|---|
| JP | 2002-190133 A | 7/2002 |
| JP | 2002-208166 A | 7/2002 |
| JP | 2003-162831 A | 6/2003 |
| JP | 2004-039109 A | 2/2004 |

* cited by examiner

*Primary Examiner*—Joseph H Feild
*Assistant Examiner*—Christopher R Lamb
(74) *Attorney, Agent, or Firm*—Crowell & Moring LLP

(57) ABSTRACT

Using one optical element on which diffraction gratings for diffracting two laser beams each having a different wavelength are formed at both surfaces, the first laser beam and the second laser beam outputted from two semiconductor lasers are made to converge on an optical disc by use of the same optical system. Directions of the grating grooves of the first diffraction grating and the second diffraction grating are set in a manner so that the direction in which a straight line binding $+1^{st}$-order, $0^{th}$-order and $-1^{st}$-order diffracted lights of the first laser beam diffracted by the first diffraction grating intersects tracks on the optical disc belongs to an opposite side to the direction in which a straight line binding $+1^{st}$-order, $0^{th}$-order, and $-1^{st}$-order diffracted lights of the second laser beam diffracted by the second diffraction grating intersects the tracks.

2 Claims, 4 Drawing Sheets

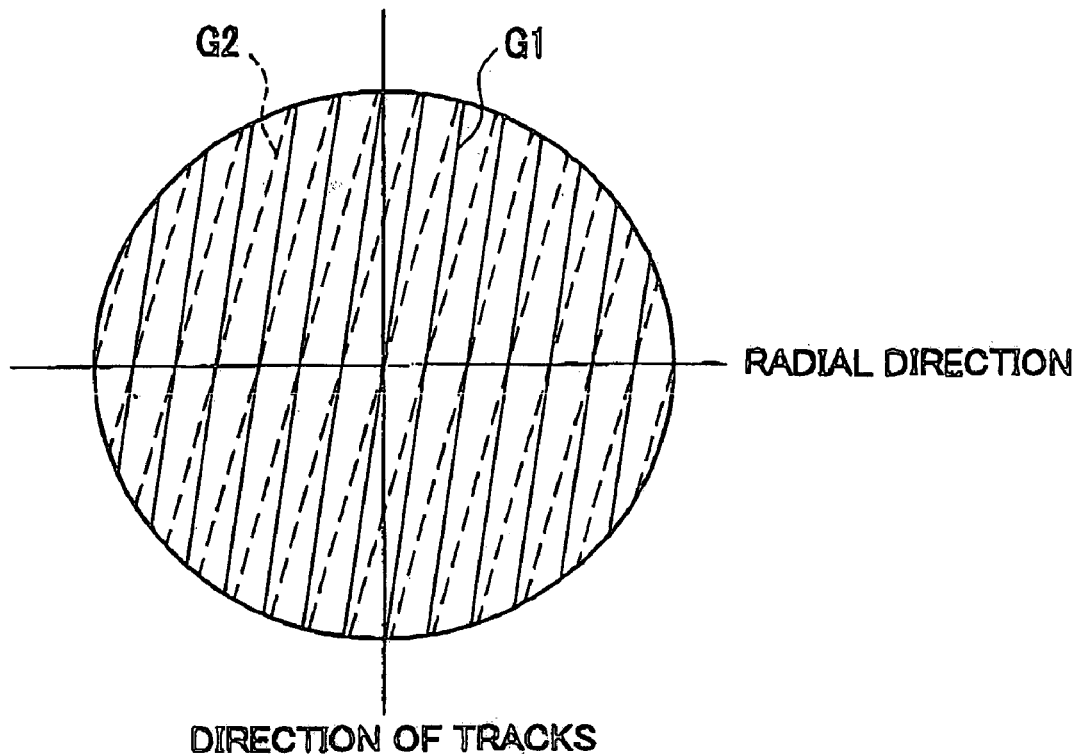
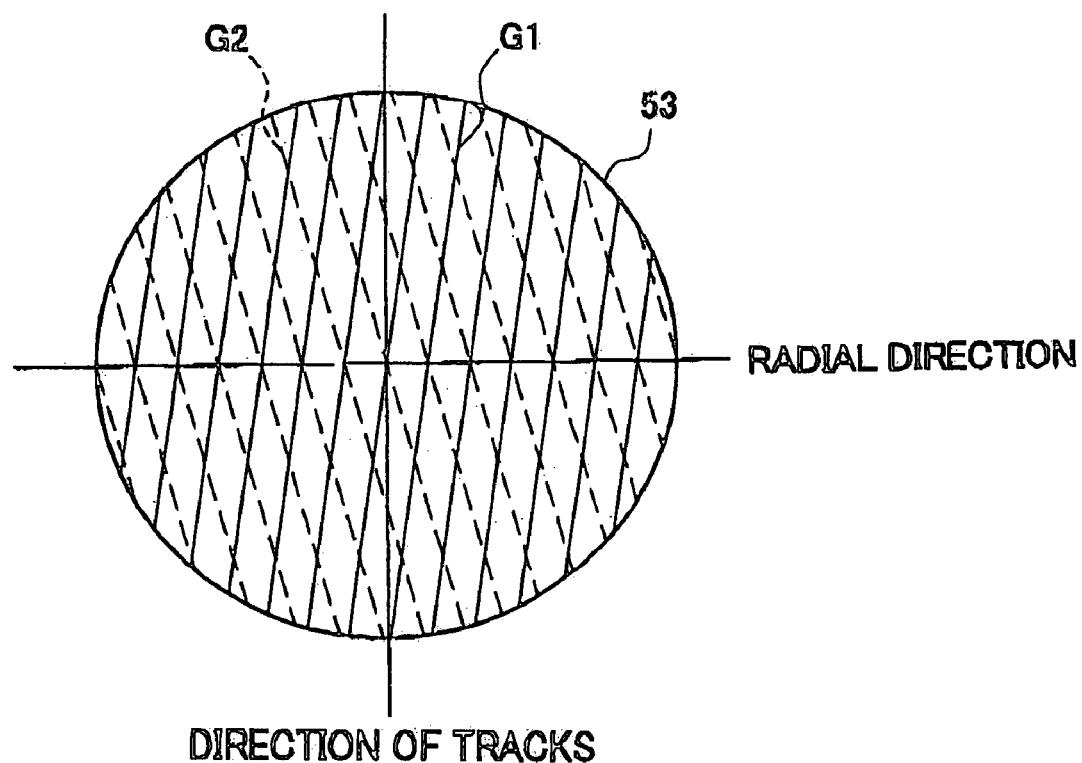

OPTICAL DISC APPARATUS

BACKGROUND OF THE INVENTION

1. Field of the Invention

The present invention relates to an optical disc apparatus, in particular, an optical disc apparatus capable of reading/recording data from/on a plurality of types of optical discs such as DVDs (Digital Versatile Disc) and CDs (Compact Disc), which vary in specification.

2. Description of the Related Art

Optical disc apparatuses such as DVD players and DVD recorders are configured to be capable of reading/recording data from/on a plurality of types of optical discs such as CDs, CD-Rs and CD-RWs (hereinafter referred to as "CD" collectively) as well as DVDs, DVD-Rs, DVD-RWs and DVD-RAMs, which vary in specification.

Hereupon, wavelengths of the laster beams used for reading/recording of data in the DVD and CD are different from each other due to difference of their recording density. Thus, two semiconductor lasers (including an integrated laser chip) are used to, output two laser beams each having a different wavelength. On the other band, to reduce an optical pickup used in the optical disc apparatuses in size and weight and lower the costs, it has been proposed that laser beams outputted from the two semiconductor lasers are converged on an optical disc using the same optical system.

Furthermore, in these optical disc apparatuses, in order to detect a tracking error, the laser beam is separated into three beams of $0^{th}$-order diffracted light, and $+1^{st}$-order diffracted light and $-1^{st}$-order diffracted light by using a diffraction grating.

In Japanese Laid-Open Patent Publication No. 2002-190133, a diffraction grating for the DVD and a diffraction grating for the CD each are formed on both surfaces of one plate-like optical element, respectively. In such a method, since the angle which a grating groove of one diffraction grating forms with a grating groove of the other diffraction grating is a smaller as 0.68 degrees. Thus, light diffracted by one diffraction grating interferes with light diffracted by the other diffraction grating. In the case of the CD, in particular, intensity ratio of sub-beams by the $+1^{st}$-order diffracted light and $-1^{st}$-order diffracted light becomes large, so that error component of a tracking error signal also becomes larger.

In Japanese Laid-Open Patent Publication No. 2003-162831, in order to make amplitude of a push-pull signal of the sub-beams by the $+1^{st}$-order diffracted light and $-1^{st}$-order diffracted light substantially zero, the diffraction grating is formed of a phase-shifting diffraction grating so as to attain a phase difference to a part of the laser beam. This phase-shifting diffraction grating is formed so that a flat plate-like optical element shaped like a square, for example, is divided into four square regions and the grating groove in two regions which are symmetrical about the center of the optical element (optical axis) is shifted from the grating groove in the other two regions by ¼ pitch. However, it is difficult to produce the optical element having such complicated grating grooves with high accuracy. This may increase the production costs and generate new problems due to error in the shape of the grating grooves.

In Japanese Laid-Open Patent Publication No. 2004-39109, in order to prevent the laser beam for CD from being diffracted by the diffraction grating for DVD and the laser beam for DVD from being diffracted by the diffraction grating for CD, the diffraction grating is formed so that depth of the grating groove is made greater than the general diffraction grating and the duty ratio of the grating groove is shifted from 0.5. However, it is difficult to produce the optical element having such complicated grating grooves with high accuracy. This may increase the production costs and generate new problems due to error in the shape of the grating grooves.

In Japanese Laid-Open Patent Publication No. 2002-208166, both surfaces of an optical element are provided with a diffraction grating. One diffraction grating closer to a light source diffracts both of the laser beam for DVD and laser beam for CD and the other diffraction grating diffracts reflected light from an optical disc again, thereby guiding the laser beam for DVD and laser beam for CD to light receiving parts provided at respective different positions. With such a configuration, two pairs of light receiving devices are required, which runs counter to the object of reducing an optical pickup in size and weight and cutting the costs.

SUMMARY OF THE INVENTION

The present invention is made to solve the above-mentioned problems, and intends to reduce an optical pickup in size and weight and cutting the costs and reduce influence of interference of diffracted light by two diffraction gratings, thereby improving detection accuracy of a tracking error signal in an optical disc apparatus.

The optical disc apparatus can read/record data from/on a plurality of types of optical discs which vary in specification by using one optical element on which a diffraction grating for diffracting two laser beams each having a different wavelength is formed at each surface, and allows the laser beams output from two semiconductor lasers to converge on an optical disc by use of the same optical system.

An optical disc apparatus in accordance with an embodiment of the present invention uses an optical pickup. The optical disc comprises a light source for outputting a first laser beam and a second laser beam each having a different wavelength corresponding to a first optical disc and a second optical disc each having a different specification, and a common optical system for allowing the first laser beam and the second laser beam to converge on the optical disc and guiding the reflected beam from the optical disc to one light receiving part.

The optical system includes a diffraction optical element on which two diffraction gratings respectively for separating the first laser beam and the second laser beam into three beams of a main beam by $0^{th}$-order diffracted light and sub-beams by $+1^{st}$-order diffracted light and $-1^{st}$-order diffracted light are formed.

The diffraction optical element has two flat surfaces which are parallel to each other, and on the optical disc, the first diffraction grating is formed on one surface and the second first diffraction grating is formed on the other surface so that a direction in which a straight line binding $+1^{st}$-order diffracted light, $0^{th}$-order diffracted light and $-1^{st}$-order diffracted light of the first laser beam diffracted by the first diffraction grating intersects the tracks on the optical disc belongs to an opposite side to a direction in which a straight line binding $+1^{st}$-order diffracted light, $0^{th}$-order diffracted light and $-1^{st}$-order diffracted light of the second laser beam diffracted by the second diffraction grating intersects the tracks on the optical disc.

According to such a configuration, the first laser beam and the second laser beam can be converged on the optical disc and the reflected beam from the optical disc to one light receiving part can be guided with using the common optical system. Thereby, it is possible to reduce the size and weight and to cut in cost of the optical pickup.

Furthermore, the optical system includes a diffraction optical element on which diffraction gratings respectively for separating the first laser beam and the second laser beam into three beams of a main beam by $0^{th}$-order diffracted light and sub-beams by $+1^{st}$-order diffracted light and $-1^{st}$-order diffracted light are formed. On the optical disc, the first diffraction grating is formed on one surface and the second first diffraction grating is formed on the other surface so that the direction in which the straight line binding each diffracted light of the first laser beam intersects the tracks on the optical disc belongs to an opposite side to the direction in which the straight line binding each diffracted light of the second laser beam intersects the tracks on the optical disc. Thus, as compared with the conventional example, it is possible to reduce influence of the diffracted light of the first diffraction grating and the diffracted light of the second diffraction grating and improve detection accuracy of the tracking error signal.

BRIEF DESCRIPTION OF THE DRAWINGS

FIG. 6 is a view for illustrating angles which a first diffraction grating and a second diffraction grating of a conventional diffraction optical element form with the direction of track; and FIG. 7 is a view for illustrating angles which a first diffraction grating and a second diffraction grating of a diffraction optical element in accordance with this embodiment form with the direction of track.

DETAILED DESCRIPTION OF THE EMBODIMENT

Figure 1:
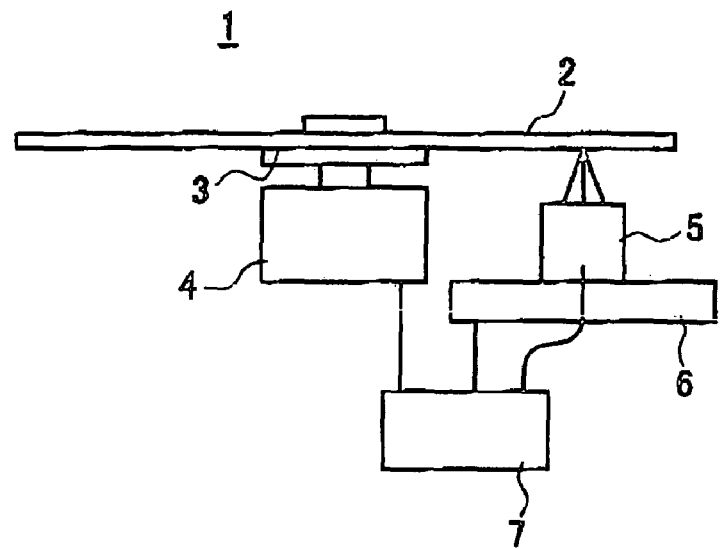
FIG. 1 is a block, diagram showing a configuration of an optical disc apparatus in accordance with an embodiment of the present invention.

An optical disc apparatus in accordance with an embodiment of the present invention and an optical pickup used in the device will be described. FIG. 1 shows a configuration of the optical disc apparatus 1 in accordance with this embodiment.

The optical disc apparatus 1 is comprised of a table 3 on which an optical disc 2 is placed, a spindle motor 4 for rotationally driving the table 3 and the optical disc 2 placed on the table 3, an optical pickup 5 for irradiating a laser beam to a surface of the optical disc 2 on which data is recorded so as to read data recorded on the optical disc 2 and/or record data on the optical disc 2, an optical pickup drive mechanism 6 for moving the optical pickup 5 in the radial direction of the optical disc 2 and a controller 7 for controlling the spindle; motor 4, optical pickup 5 and optical pickup drive mechanism 6.

The optical disc apparatus 1 is, for example, a DVD recorder which can read data from reproduce-only DVD (ROM) and CD (ROM) and read/record data from/on recordable DVD-R, DVD-RW, DVD-RAM, CD-R and CD-RW. Hereinafter, DVD, DVD-R, DVD-RW and DVD-RAM are collectively referred to as "DVD" and CD, CD-R and CD-RW are collectively referred to as "CD".

Figure 2:
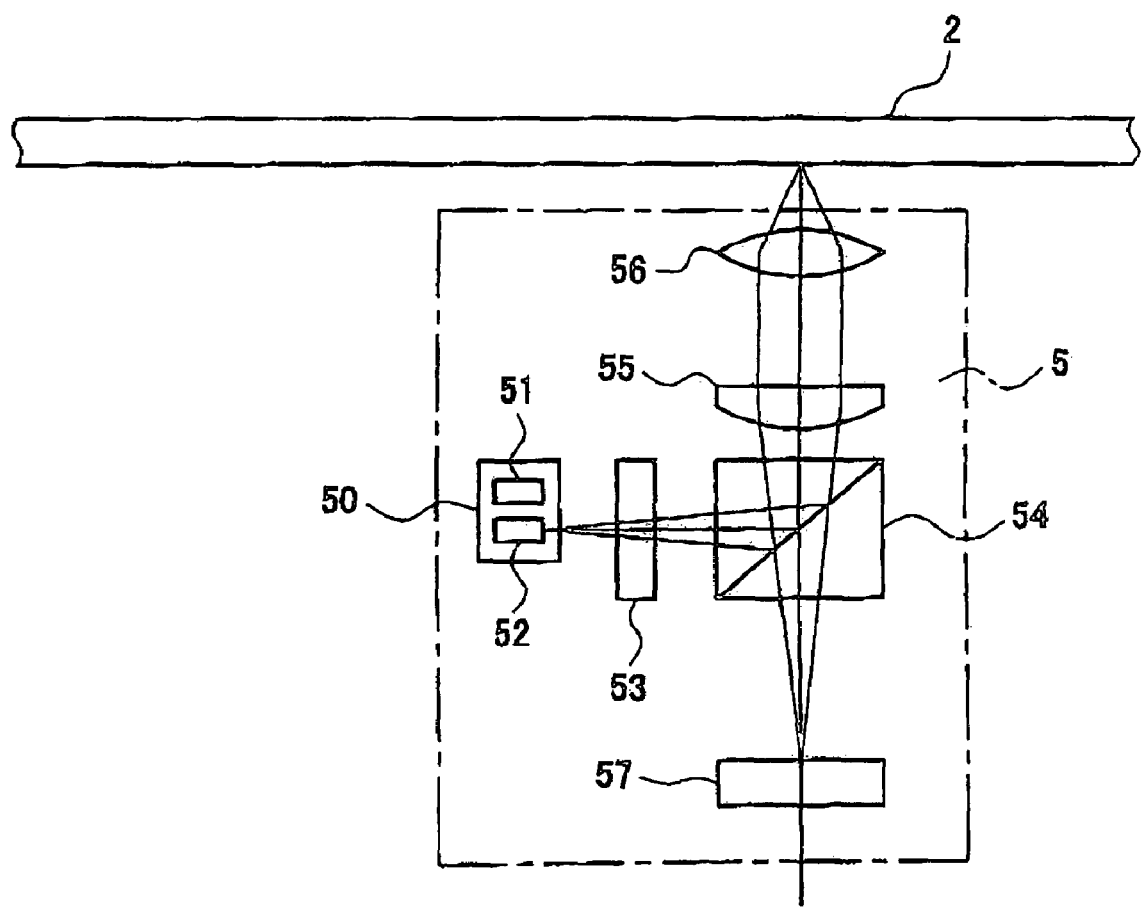
FIG. 2 is a view showing a configuration of an optical pickup in the optical disc apparatus.

FIG. 2 shows a configuration of the optical pickup 5 used in the optical disc apparatus 1. The optical pickup 5 has a first laser light source 51 for outputting a first laser beam with a wavelength of 660 nm (first wavelength) adaptable to DVD (first optical disc) and a second laser light source 52 for outputting a second laser beam with a wavelength of 797 nm (second wavelength) adaptable to CD (second optical disc). The first laser light source 51 and second laser light source 52 are arranged in substantially parallel with each other about 100 μm apart and formed of one chip as a semiconductor laser device 50.

A diffraction optical element 53 is provided for opposing to a light-emitting surface of the semiconductor laser device 50 in a manner so that at least a portion opposing to the light-emitting surface of the semiconductor laser device 50 is shaped like a parallel plate. On a surface of the diffraction optical element 53 opposing to the light-emitting surface of the semiconductor laser device 50, a first diffraction grating is formed for diffracting the first laser beam adaptable to DVD, for example, to separate the beam into three beams of a main beam by $0^{th}$-order diffracted light and sub-beams by $+1^{st}$-order diffracted light and $-1^{st}$-order diffracted light. Furthermore, on the opposite surface of the surface opposing to the light-emitting surface of the semiconductor laser device 50, a second diffraction grating is formed for diffracting the second laser beam adaptable to CD, for example, to separate the beam into three beams of a main beam by $0^{th}$-order diffracted light and sub-beams by $+1^{st}$-order diffracted light and $-1^{st}$-order diffracted light.

A half mirror 54, which allows a part of the three beams separated by the diffraction optical element 53 to pass through and the remainder to be reflected in substantially perpendicular direction, is provided on the extension of an optical axis binding the semiconductor laser device 50 to the diffraction optical element 53. In this embodiment, the optical axis bent by the half mirror 54 at right angles is set to be perpendicular to the data recording surface of the optical disc 2. On the optical axis bent by the half mirror 54 at right angles, a collimator lens 55 for collimating each of the three beams reflected by the half mirror 54 and an object lens 56 for allowing the collimated beams to converge on the data recording surface of the optical disc 2 are provided. Furthermore, on the extension of the optical axis bent by the half mirror 54 on the other side of the optical disc 2, a light receiving device 57 is provided for receiving the reflected beam which is reflected by the optical disc 2, converged by the object lens 56 and collimator lens 55 and passes through the half mirror 54.

Figure 3:
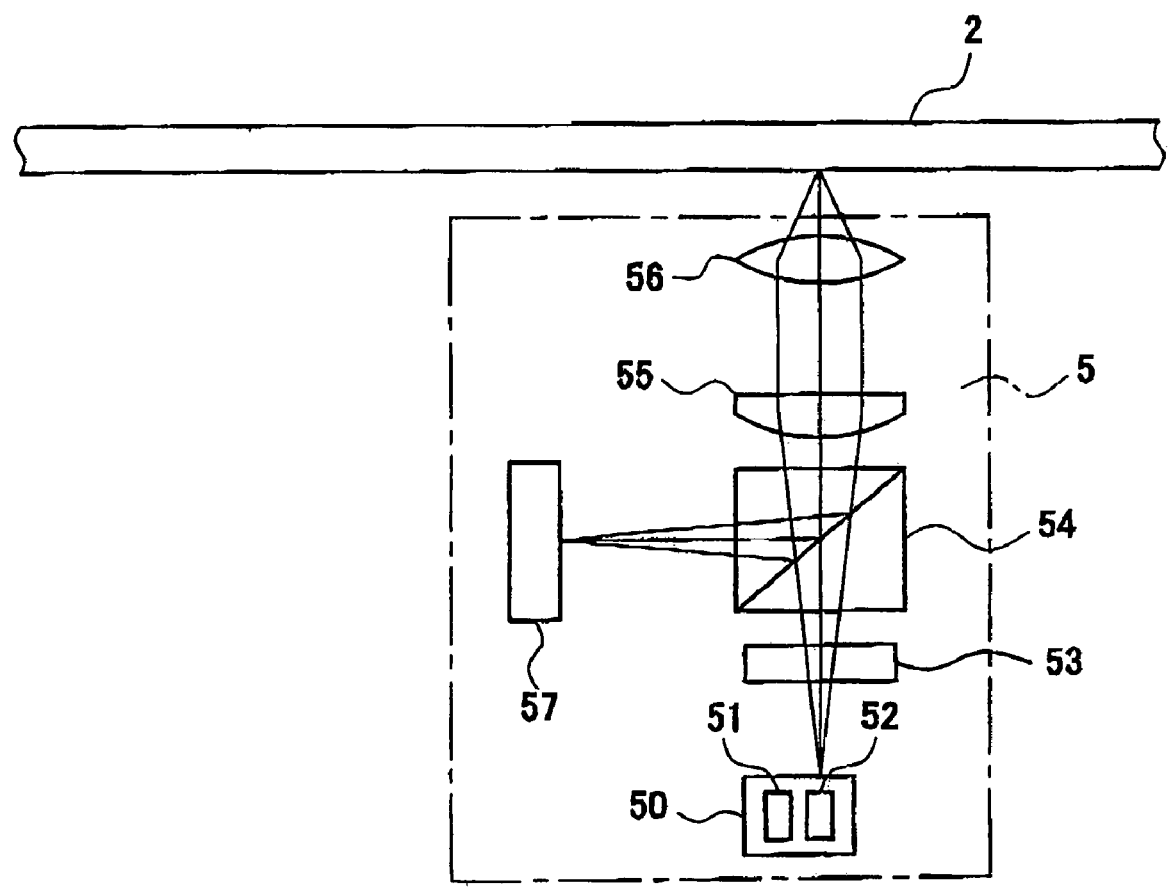
FIG. 3 is a view showing a configuration of a modification of the optical pickup in the optical disc apparatus.

Arrangement of each component is not limited to this. As shown in FIG. 3, the semiconductor laser device 50 and diffraction optical element 53 may be arranged on the optical axis perpendicular to the data recording surface of the optical disc 2 and the light receiving device 57 may be arranged on the optical axis bent by the half mirror 54 in the direction parallel to the data recording surface of the optical disc 2.

Subsequently, the direction of grating grooves of the first diffraction grating and the second diffraction grating formed on the diffraction optical element 53 will be described. Generally, a three beam method is employed to detect a tracking error in reproducing of the CD. A push-pull method, for example, can be employed in reproducing of the DVD. In either case, the laser beam is diffracted to form three beams of the main beam by $0^{th}$-order diffracted light and sub-beams by $+1^{st}$-order diffracted light and $-1^{st}$-order diffracted light with using the diffraction grating.

Figure 4:
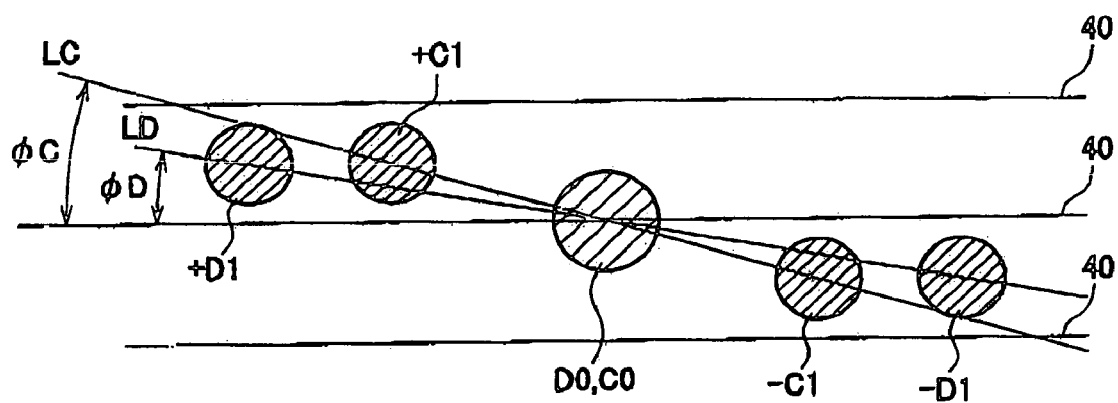
FIG. 4 is a view showing relation between positions of three beams converged on an optical disc in a conventional optical disc apparatus and tracks on the optical disc.

FIG. 4 shows the relation between positions of the three beams converged on the optical disc and tracks on the optical disc in the conventional optical disc apparatus disclosed in, for example, Japanese Laid-Open Patent Publication No. 2002-190133. In FIG. 4, tracks on the optical disc are illustrated as parallel straight lines 40. For facilitating comparison, a main beam D0 by $0^{th}$-order diffracted light of the first laser beam diffracted by the first diffraction grating adaptable to DVD and a main beam C0 by $0^{th}$-order diffracted light of the second laser beam diffracted by the second diffraction grating adaptable to CD are illustrated at the same position. Symbols +D1 and −D1 respectively correspond to DVD and represent positions of sub-beams by +$1^{st}$-order diffracted light and −$1^{st}$-order diffracted light of the first laser beam diffracted by the first diffraction grating. Symbols +C1 and −C1 respectively correspond to CD and represent positions of sub-beams by +$1^{st}$-order diffracted light and −$1^{st}$-order diffracted light of the second laser beam diffracted by the second diffraction grating.

As can be seen from FIG. 4, on the optical disc in the conventional optical disc apparatus, the directions of the grating grooves of the first diffraction grating and the second diffraction grating are set in a manner so that the direction in which a straight line LD binding +$1^{st}$-order diffracted light +D1, $0^{th}$-order diffracted light D0 and −$1^{st}$-order diffracted light −D1 of the first laser beam diffracted by the first diffraction grating intersects the tracks 40 belongs to the same side as the direction in which a straight line LC binding +$1^{st}$-order diffracted light +C1, $0^{th}$-order diffracted light C0 and −$1^{st}$-order diffracted light −C1 of the second laser beam diffracted by the second diffraction grating intersects the tracks 40. In FIG. 4, an angle which the straight line LD forms with the track 40 is defined as φ D, and an angle which the straight line LC forms with the track 40 is defined as φ C.

Thus, as described in Japanese Laid-Open Patent Publication No. 2002-190133, the angle (φ C−φ D), which the grating groove of the first diffraction grating forms with the grating groove of the second diffraction grating, becomes a small value of 0.68 degrees, so that the light diffracted by the first diffraction grating interferes with the light diffracted by the second diffraction grating. In the case of CD, there is a problem that intensity ratio of sub-beams by the +$1^{st}$-order diffracted light and −$1^{st}$-order diffracted light becomes larger and error component of a tracking error signal also becomes larger.

Figure 5:
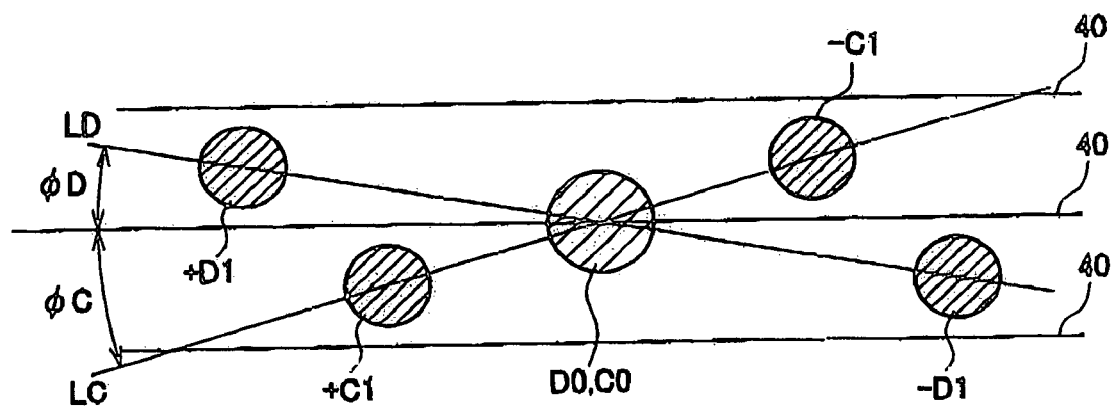
FIG. 5 is a view showing relation between positions of three beams converged on the optical disc in the optical disc apparatus in accordance with this embodiment and tracks on the optical disc.

Subsequently, the relation between positions of the three beams converged on the optical disc 2 and tracks 40 on the optical disc in the optical disc apparatus 1 in accordance with this embodiment is shown in FIG. 5. The same reference numerals in FIG. 5 denote the same components as in FIG. 4.

As can be seen from FIG. 5, on the optical disc 2 in the optical disc apparatus 1 in accordance with this embodiment, the directions of the grating grooves of the first diffraction grating and the second diffraction grating are set in a manner so that the direction in which the straight line LD binding +$1^{st}$-order diffracted light +D1, $0^{th}$-order diffracted light D0 and −$1^{st}$-order diffracted light −D1 of the first laser beam diffracted by the first diffraction grating intersects the tracks 40 belongs to an opposite side to the direction in which the straight line LC binding +$1^{st}$-order diffracted light +C1, $0^{th}$-order diffracted light C0 and −$1^{st}$-order diffracted light −C1 of the second laser beam diffracted by the second diffraction grating intersects the tracks 40.

Thus, the angle (φ C+φ D), which the grating groove of the first diffraction grating forms with the grating groove of the second diffraction grating, becomes about 1.8 degrees larger than that in the conventional device. Thus, there is a smaller possibility that the light diffracted by the first diffraction grating interferes with the light diffracted by the second diffraction grating. In the case of CD, there is a problem that intensity ratio of sub-beams by the +$1^{st}$-order diffracted light and −$1^{st}$-order diffracted light becomes smaller and error component of a tracking error signal can be made smaller. As a result since influence of interference of the first diffraction grating with the light diffracted by the second diffraction grating is reduced and detection accuracy of the tracking error signal is improved, performance of the optical pickup 5 and the optical disc apparatus 1 using it is stabilized.

FIG. 6 shows an example of the conventional diffraction optical element. FIG. 7 shows an example of the diffraction optical element 53 in accordance with this embodiment. In FIGS. 6 and 7, angles φ C and φ D which the grating groove G1 of the first diffraction grating and grating groove G2 of the second diffraction grating, respectively, with the direction of track of the optical disc 2 are illustrated in an exaggerated way.

As understood from comparison of FIG. 6 with FIG. 7, the diffraction optical element 53 is different from the conventional diffraction optical element only in the directions of the diffraction grooves, and production process and costs remain as usual. When the tracking error signal is detected, although a method of calculating a signal output from each light receiving region of the light receiving device needs to be modified slightly, it can be addressed by rewriting an arithmetic program. As a result, using one optical system, the first laser beam and second laser beam each having a different wavelength can be converged on the respective first optical disc and second optical disc, and a reflected beam from the optical disc can be converged on the light receiving device. Thus, it is possible to enable reduction of the optical disc apparatus 1 in size and weight and cut in costs.

Although the DVD recorder is used as an example of the optical disc apparatus in the above description of the embodiment, the present invention is not limited to this. The present invention can be applied to the whole range of optical disc apparatus which is capable of reading/recording data from/on a plurality of types of optical discs having different specifications. Furthermore, the optical disc is not limited to DVD and CD and needless to say, can support an optical disc with new format which will be put to practical use in future.

This application is based on Japanese patent application 2004-213801 filed Jul. 22, 2004 in Japan, the contents of which are hereby incorporated by references.

Although the present invention has been fully described by way of example with reference to the accompanying drawings, it is to be understood that various changes and modifications will be apparent to those skilled in the art, Therefore, unless otherwise such changes and modifications depart from the scope of the present invention, they should be construed as being included therein.

What is claimed is:

1. An optical disc apparatus using an optical pickup, wherein
the optical disc comprises a light source for outputting a first laser beam and a second laser beam each having a different wavelength corresponding to a first optical disc and a second optical disc each having a different specification, and a common optical system for allowing the first laser beam and the second laser beam to converge on the optical disc and guiding the reflected beam from the optical disc to one light receiving part;
the optical system includes a diffraction optical element on which two diffraction gratings respectively for separating the first laser beam and the second laser beam into three beams of a main beam by $0^{th}$-order diffracted light and sub-beams by $+1^{st}$-order diffracted light and $-1^{st}$-order diffracted light are formed; and the diffraction optical element has two flat surfaces which are parallel to each other, and on the optical disc, the first diffraction grating is formed on one surface and the second first diffraction grating is formed on the other surface so that a direction in which a straight line binding $+1^{st}$-order diffracted light, $0^{th}$-order diffracted light and $-1^{st}$-order diffracted light of the first laser beam diffracted by the first diffraction grating intersects the tracks on the optical disc belongs to an opposite side to a direction in which a straight line binding $+1^{st}$-order diffracted light, $0^{th}$-order diffracted light and $-1^{st}$-order diffracted light of the second laser beam diffracted by the second diffraction grating intersects the tracks on the optical disc.

2. An optical disc apparatus using an optical pickup comprising:

a first laser light source for outputting a first laser beam having a first wavelength adaptable to a first optical disc;

a second laser light source provided in substantially parallel with and distant a predetermined distance from the first laser light source for outputting a second laser beam having a second wavelength adaptable to a second optical disc having a specification which is different from that of the first optical disc;

a diffraction optical element on which diffraction gratings for diffracting the first laser beam outputted from the first laser light source and the second laser beam outputted from the second laser light source and separating the beam into three beams of a main beam by $0^{th}$-order diffracted light and sub-beams by $+1^{st}$-order diffracted light and $-1^{st}$-order diffracted light are formed;

a half mirror for passing through a part of the three beams separated by the diffraction optical element and reflecting the remainder in a predetermined direction;

a collimator lens for collimating each of the three beams which pass through or are reflected by the half mirror;

an object lens for allowing the collimated beams collimated by the collimator lens to converge on the data recording surface of the optical disc; and a light receiving device for receiving a reflected beam which is converged by the object lens and the collimator lens and is reflected by the half mirror or passes through the half mirror; wherein the diffraction optical element has two flat surfaces which are parallel to each other, a first diffraction grating for diffracting the first laser beam is formed on one surface and the second first diffraction grating for diffracting the second laser beam is formed on the other surface;

the direction of grating grooves of the first diffraction grating and the second diffraction grating is set so that a direction in which a straight line binding $+1^{st}$-order diffracted light, $0^{th}$-order diffracted light and $-1^{st}$-order diffracted light of the first laser beam diffracted by the first diffraction grating intersects tracks on the optical disc belongs to an opposite side to a direction in which a straight line binding $+1^{st}$-order diffracted light, $0^{th}$-order diffracted light and $-1^{st}$-order diffracted light of the second laser beam diffracted by the second diffraction grating intersects the tracks on the optical disc; and influence of interference of diffracted light by the first diffraction grating and the second diffraction grating is reduced by making an angle which the grating groove of the first diffraction grating forms with the grating groove of the second diffraction grating to improve detection accuracy of a tracking error signal is improved.

* * * * *